United States Patent
Freeman

(10) Patent No.: US 11,982,186 B1
(45) Date of Patent: May 14, 2024

(54) VAPOR POWERED ELECTRO-MECHANICAL GENERATOR

(71) Applicant: Walter B. Freeman, Cave Junction, OR (US)

(72) Inventor: Walter B. Freeman, Cave Junction, OR (US)

( * ) Notice: Subject to any disclaimer, the term of this patent is extended or adjusted under 35 U.S.C. 154(b) by 16 days.

(21) Appl. No.: 18/080,638

(22) Filed: Dec. 13, 2022

Related U.S. Application Data

(60) Provisional application No. 63/308,803, filed on Feb. 10, 2022.

(51) Int. Cl.

| | |
|---|---|
| *F01B 11/00* | (2006.01) |
| *F01B 23/10* | (2006.01) |
| *F01B 25/10* | (2006.01) |
| *F01B 31/08* | (2006.01) |
| *F01K 11/00* | (2006.01) |
| *F01B 31/10* | (2006.01) |
| *H02K 7/18* | (2006.01) |

(52) U.S. Cl.
CPC ............ *F01B 23/10* (2013.01); *F01B 11/001* (2013.01); *F01B 25/10* (2013.01); *F01B 31/08* (2013.01); *F01K 11/00* (2013.01); *F01B 31/10* (2013.01); *H02K 7/1884* (2013.01)

(58) Field of Classification Search
CPC ..... H02K 7/1884; F01B 11/001; F01B 23/10; F01B 25/10; F01B 31/08; F01B 31/10; F01K 11/00
USPC .......... 290/1 A, 1 R; 123/46 R, 46 E; 310/15
See application file for complete search history.

(56) References Cited

U.S. PATENT DOCUMENTS

| | | | | |
|---|---|---|---|---|
| 8,616,162 | B2* | 12/2013 | Najt | H02K 7/1884 |
| | | | | 123/46 B |
| 10,794,227 | B1 | 10/2020 | Freeman | |
| 2008/0271711 | A1* | 11/2008 | Cheeseman | F02B 71/00 |
| | | | | 123/46 E |
| 2011/0187124 | A1* | 8/2011 | Milinkovic | F01K 25/08 |
| | | | | 290/1 A |
| 2020/0373824 | A1* | 11/2020 | Apo | F03G 7/08 |

FOREIGN PATENT DOCUMENTS

| | | |
|---|---|---|
| AT | 519599 B1 | 12/2018 |
| CN | 201507401 U | 6/2010 |
| CN | 110273721 A | 9/2019 |
| CN | 111878223 A | 11/2020 |
| DE | 4136099 A1 | 5/1993 |
| JP | 2010265808 A | 11/2010 |

* cited by examiner

*Primary Examiner* — Julio C. Gonzalez
(74) *Attorney, Agent, or Firm* — Jerry Haynes Law

(57) ABSTRACT

A vapor powered electro-mechanical generator comprises a cylinder, which is sealed at both ends in which two pistons slidingly move in opposite directions simultaneously. A tube on which the pistons also slide lies at the center of the longitudinal axis of the cylinder. The tube transfers vapor from the inlet to the pressurized side of the pistons to actuate pistons, while one or more exhaust valves are simultaneously opened on the opposite end of the piston stroke allowing the expanded vapor to flow to a condensing system. The pistons consist of magnets at their peripheral circumference. As the vapor expands, the pistons magnets move through coils of conductive wire producing electric current. Further, repulsion magnets repel corresponding piston magnets to provide a cushioned rebound effect while conserving momentum of the generator.

19 Claims, 2 Drawing Sheets

VAPOR POWERED ELECTRO-MECHANICAL GENERATOR

CROSS-REFERENCE TO RELATED APPLICATIONS

This application claims priority from U.S. Provisional Application No. 63/308,803, entitled "Vapor Powered Electro-Mechanical Generator", filed on Feb. 11, 2022, which application is hereby incorporated herein by reference in its entirety.

FIELD OF THE INVENTION

The present invention relates generally to vapor powered electricity generators. More so, the present invention relates to a portable vapor powered electro-mechanical generator.

BACKGROUND OF THE INVENTION

The following background information may present examples of specific aspects of the prior art (e.g., without limitation, approaches, facts, or common wisdom) that, while expected to be helpful to provide additional aspects of the prior art, is not to be construed as limiting the present invention, or any embodiments thereof, to anything stated or implied therein or inferred thereupon.

Numerous attempts have been made and several prior art devices are known for variety of steam (water vapor) powered electricity generating devices. Even though these innovations may be suitable for the specific purposes to which they address, however, they would not be as suitable for the purposes of the present invention.

For example, Chinese Pat. No. CN201507401U to Jiang discloses a steam generator for solar electric power generator comprising a steam expansion generator and a permanent-magnetic generator. Air inlet of the generator and the flywheel of the steam expansion generator is correspondingly arranged to generate electric energy with cooperation of the steam generator and the permanent-magnetic generator.

Chinese Pat. No. CN111878223A to Jianhua describes a gas-steam linear generator which comprises permanent magnets arranged with a fuel gas power source and a steam power source to generate electric power.

Chinese Pat. No. CN110273721A to Bai Jin et al. discloses a steam type micro free piston power generating device comprising a cylinder with a piston mechanism having magnetic laminations at its both ends to generate electric power.

Japanese Pat. No. JP2010265808A to Sadatomo teaches a free piston type waste energy regeneration device driven by waste steam of a waste heat boiler, wherein the device is provided with magnets attached to an end part of a piston rod extending to outside of the cylinder and power generation coils near a moving route of the magnets.

German Pat. No. DE4136099A1 to Duesseldorf discloses a two-stroke free-piston steam engine that generates steam energy in sealed cylinder and uses motion of permanent magnets with respect to coils to generates electricity.

Austrian Pat. No. AT519599B1 to Dolezal relates to a device comprising a rotary piston motor generator that converts steam energy into electricity, wherein the motor generator consists of a paramagnetic stator. A gap between the magnets slats and stator inner wall is provided, so that the magnets lamellae no longer touch the stator inner wall and thus avoid the wall friction. As a result, a maintenance-free operation is possible.

It is apparent now that numerous innovations that are adapted to a variety of generator that converts steam energy into electricity have been developed in the prior art that are adequate for various purposes. Furthermore, even though these innovations may be suitable for the specific purposes to which they address, accordingly, they would not be suitable for the purposes of the present invention as heretofore described. Thus, a portable, simple, and adaptable vapor powered electro-mechanical generator that allows controlled operation to generate electricity is needed.

SUMMARY OF THE INVENTION

The present invention relates to a vapor powered electro-mechanical generator, wherein the generator comprises a cylinder, which is sealed at both ends in which two pistons slidingly move in opposite directions simultaneously. A tube on which the pistons also slide lies at the center of the longitudinal axis of the cylinder. The tube transfers vapor from the inlet to the pressurized side of the pistons. Said tube also contains vapor inlet valves to introduce vapor to actuate pistons. As the vapor is introduced on the pressure side of the piston, one or more exhaust valves are simultaneously opened on the opposite end of the piston stroke allowing the expanded vapor to flow to a condensing system. The pistons consist of magnets at their peripheral circumference. As the vapor expands, the pistons magnets move through coils of conductive wire producing electric current. The polarity of the piston magnets is arranged so that when the pistons approach each other or move close to the ends of the cylinder at the end of their respective strokes, respective repulsion magnets repel corresponding piston magnets providing a cushioned rebound effect while conserving momentum.

It is an objective of the present invention to provide a vapor powered electro-mechanical generator comprising opposed reciprocating free pistons powered by expanding vapor.

It is another objective of the present invention to provide pistons that include piston magnets that are placed at the circumference at the periphery of the pistons.

It is another objective of the present invention to provide repulsion magnets that limit piston travel and conserve energy of momentum.

It is yet another objective of the present invention to provide a simplified rotating vapor inlet valve to control inlet of vapor into the cylinder.

It is another objective of the present invention to provide a vapor powered electro-mechanical generator that is simple to construct and operate while economic to manufacture.

It is another objective of the present invention to provide a vapor powered electro-mechanical generator that is easily controlled and scaled for adapting to various applications as per the need.

It is another objective of the present invention to provide a vapor powered electro-mechanical generator that is quite in operation thereby not causing any sound pollution.

It is yet another objective of the present invention to provide a vapor powered electro-mechanical generator that is portable.

It is another objective of the present invention to provide a vapor powered electro-mechanical generator that can be used in hybrid-electric vehicles.

It is further another objective of the present invention to provide a vapor powered electro-mechanical generator that allows energy recovery from combustion exhaust streams, solar thermal energy, geothermal energy, nuclear energy while allowing to use in combination with thermal energy storage systems.

These and other objectives, advantages and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIGS. 1-2. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

Figure 1:
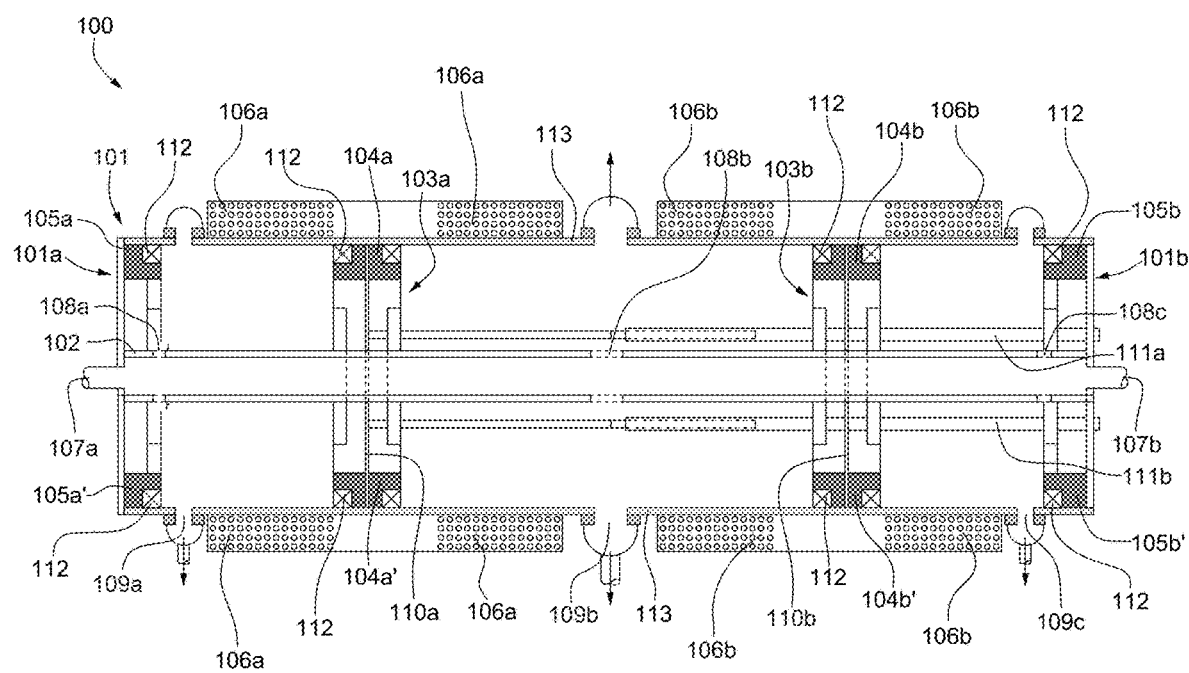
FIG. 1 illustrates a cross-sectional view of an exemplary vapor powered electro-mechanical generator, in accordance with an embodiment of the present invention.

According to several embodiments of the present invention as shown in FIG. 1, a vapor powered electro-mechanical generator (100) that produces electricity using vapor to move reciprocating/opposed pistons containing magnets through coils of electrically conductive material. The polarity of the piston magnets (104a, 104b, 104a', 104b') is arranged so that when the pistons (103a, 103b) approach each other at the end of their respective strokes, the rebound magnets (105a, 105b, 105a', 105b') generates a repulsive force between the piston magnets and the respective rebound magnets attached to the end s of the cylinder (101), thereby providing a cushioned rebound effect while conserving momentum. Rebound magnets operate in the same manner at opposite ends of the piston strokes.

According to an aspect of the present invention, a vapor powered electro-mechanical generator (100), wherein the generator (100) comprises: a cylinder (101) which is sealed at both ends, wherein the cylinder (101) is provided with two peripheral vapor inlet valves (108a, 108c) and a central vapor inlet valve (108b); two pistons (103a, 103b) configured to slide simultaneously along the longitudinal axis of the cylinder (101) in opposite directions with the introduction of pressurized vapor from the vapor inlet valves (108a, 108b, 108c); one or more piston magnets (104a, 104b) are attached to upper peripheral circumference of the pistons (103a, 103b), and one or more piston magnets (104a', 104b') are attached to lower peripheral circumference of the pistons (103a, 103b); one or more repulsion magnets (105a, 105b) are attached to upper peripheral circumference of the cylinder (101) and one or more repulsion magnets (105a', 105b') are attached to lower peripheral circumference of the cylinder (101), wherein the repulsion magnets and the corresponding piston magnets are configured to face each other with similar polarity to generate repulsive force when they approach each other to provide cushioned rebound effect to movement of the pistons (103a, 103b) while conserving momentum; three exhaust valves (109a, 109b, 109c) are configured to be opened by the introduction of vapor; and one or more field coil windings (106a, 106b) attached to the wall of the cylinder (101), wherein movement of the piston magnets (104a, 104a', 104b, 104b') through the coil windings (106a, 106b) to produce electricity.

According to another aspect of the present invention, the pistons (103a, 103b) are slidingly sealed to a longitudinal tube (102) that is coaxially positioned along the length of the cylinder (101).

According to another aspect of the present invention, the pistons (103a, 103b) configured to be positioned between the two peripheral vapor inlet valves (108a, 108c) with the central vapor inlet valve (108b) positioned between the pistons (103a, 103b).

According to another aspect of the present invention, the piston magnets (104a, 104a', 104b, 104b') are 'L-shaped' magnets.

According to another aspect of the present invention, the repulsion magnets (105a, 105a', 105b, 105b') are 'L-shaped' magnets.

According to another aspect of the present invention, the pistons (103a, 103b) are provided with a cylinder cooling/lubricating system that is configured to provide cooling fluid to piston cooling ducts (110 a, b) via telescoping tubes (111a, 111b).

According to another aspect of the present invention, a portable vapor powered electro-mechanical generator (100), wherein the generator (100) comprises: a cylinder (101) which is sealed at both ends, wherein the cylinder (101) is provided with a central tube (102) coaxially positioned along the length of the cylinder (101), the tube is provided with two peripheral vapor inlet valves (108a, 108c) and a central vapor inlet valve (108b); at least two mutually opposed pistons (103a, 103b) are slidingly sealed to the central tube (102) longitudinally between the two peripheral vapor inlet valves (108a, 108c) with the central vapor inlet valve (108b) positioned between the pistons (103a, 103b), thereby with the introduction of pressurized vapor from the inlet valves (108a, 108b, 108c), the pistons (103a, 103b) slide along the longitudinal axis of the cylinder (101) in opposite directions simultaneously along the length of the central tube (102); one or more 'L-shaped' piston magnets (104a, 104b) are attached to upper peripheral circumference of the pistons (103a, 103b), and one or more 'L-shaped' magnets (104a', 104b') are attached to lower peripheral circumference of the pistons (103a, 103b); one or more 'L-shaped' repulsion magnets (105a, 105b) are attached to upper peripheral circumference of the cylinder (101) and one or more 'L-shaped' repulsion magnets (105a', 105b') are attached to lower peripheral circumference of the cylinder (101), wherein the repulsion magnets having similar polarity corresponding to the adjacent piston magnet repulse each other to provide cushioned rebound effect to movement of the pistons (103a, 103b) while conserving momentum; at least three exhaust valves (109a, 109b, 109c) fitted to the outer circumference of the cylinder (101) proximate to the terminus of travel of each of the pistons (103a, 103b), wherein the exhaust valves (109a, 109b, 109c) are opened at the initiation of the power stroke caused by the introduction of vapor through the inlet valves (108a, 108b, 108c), thereafter the exhaust vapor is ducted to a condensing system; a cylinder cooling/lubricating system configured to cool/lubricate the pistons (103a, 103b), wherein the cooling/lubricating system provides cooling/lubricating fluid to piston ring lands (110 a, b) via telescoping tubes (111a, 111b) attached at both ends of the cylinder; and one or more field coil windings (106a, 106b) attached to the external wall of the cylinder (101) at a position adjacent to the end points of the strokes of the pistons along the length of the wall of the cylinder (101), wherein movement of the piston magnets (104a, 104a', 104b, 104b') through the coil windings (106a, 106b) to produce electricity.

According to another aspect of the present invention, the tube (102) comprises an interior concentric tube (not shown) that is equipped with vapor ports to provide appropriate valve action by partial rotation of the interior tube in order to align ports in both the interior and external tube to introduce vapor to actuate pistons (103a, 103b).

According to another aspect of the present invention, the repulsion magnets (105a, 105b, 105a', 105b') are located at a predetermined distance from the cylinder wall so as to minimize magnetic interference.

According to another aspect of the present invention, the exhaust valves (109a, 109b, 109c) are configured to be individually activated by an electronic controller-controlled solenoid.

According to another aspect of the present invention, the vapor inlet valves (108a, 108b, 108c) are configured to be individually activated by an electronic controller-controlled solenoid.

According to another aspect of the present invention, the portable generator is configured with solenoid activated injections to provide a high enthalpy fluid in a thermodynamic state to become vapor, so as to power the generator.

According to another aspect of the present invention, speed of sliding movement of the pistons (103a, 103b) is controlled using a control system.

According to another aspect of the present invention, the cooling system uses cooling fluid, whereby the flow rate of the cooling fluid is controlled by an external metered pump.

According to another aspect of the present invention, the pistons (104a, 104b) and the sealed ends (101a, 101b) of the cylinder (101) are provided with plurality of air-tight seals (112).

Figure 2:
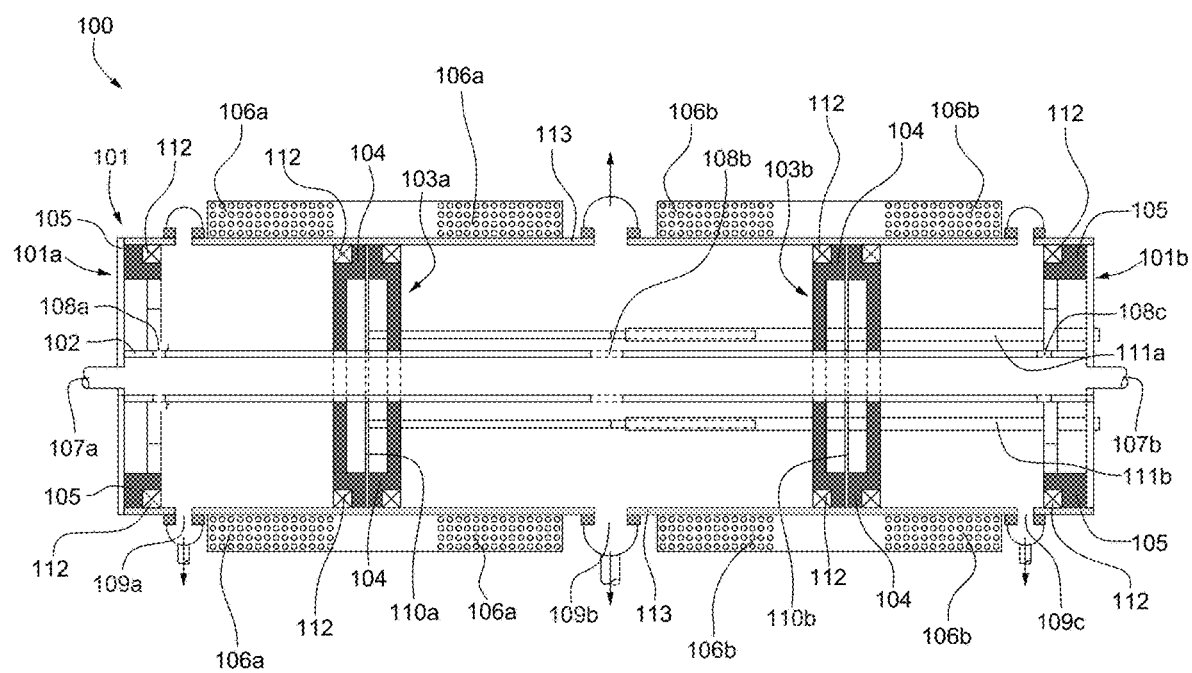
FIG. 2 illustrates a cross-sectional view of an exemplary vapor powered electro-mechanical generator with a single circumferential magnet on each piston, in accordance with an embodiment of the present invention.

According to another aspect of the present invention, the external surface of the cylinder (101) is provided with at least one insulation layer (113) so as to provide insulation between the cylinder (101) and the conducting coil windings (111a, 111b). According to another aspect of the present invention as shown in FIG. 2, a portable vapor powered electro-mechanical generator (100), wherein the generator comprises: a cylinder (101) which is sealed at both ends, wherein the cylinder (101) is provided with a central tube (102) coaxially positioned along the length of the cylinder (101), the tube is provided with two peripheral vapor inlet valves (108a, 108c) and a central vapor inlet valve (108b); at least two mutually opposed pistons (103a, 103b) are slidingly sealed to the central tube (102) longitudinally between the two peripheral vapor inlet valves (108a, 108c) with the central vapor inlet valve (108b) positioned between the pistons (103a, 103b), thereby with the introduction of pressurized vapor from the inlet valves (108a, 108b, 108c), the pistons (103a, 103b) slide along the longitudinal axis of the cylinder (101) in opposite directions simultaneously along the length of the central tube (102), wherein speed of sliding movement of the pistons (103a, 103b) is controlled using a control system; one 'L-shaped' piston magnet (104) is attached to the circumference of each of the pistons (103a, 103b); one 'L-shaped' repulsion magnets (105) is configured to mount on the entire inner circumference of the cylinder (101) on both ends of the cylinder (101), wherein the repulsion magnet and corresponding adjacent piston magnet have similar polarity to repulse each other so as to provide cushioned rebound effect to movement of the pistons (103a, 103b) while conserving momentum; at least three exhaust valves (109a, 109b, 109c) fitted to the outer circumference of the cylinder (101) proximate to the terminus of travel of each of the pistons (103a, 103b), wherein the exhaust valves (109a, 109b, 109c) are opened at the initiation of the power stroke caused by the introduction of vapor through the inlet valves (108a, 108b, 108c), thereafter the exhaust vapor is ducted to a condensing system; a cylinder cooling system configured to cool the pistons (103a, 103b), wherein the cooling system is controlled by an external metered pump to provide cooling/lubricating fluid to piston ring lands (110 a, 110b) via telescoping tubes (111a, 111b) attached at both ends of the cylinder; and one or more field coil windings (106a, 106b) attached with at least one insulation layer (113) to the external wall of the cylinder (101) at a position adjacent to the end points of the strokes of the pistons along the length of the wall of the cylinder (101), wherein movement of the piston magnets (104) through the coil windings (106a, 106b) produces electricity.

According to an embodiment of the present invention as shown in FIG. 1, the generator (100) comprising a cylinder (101) which is sealed at both ends (101a, 101b). The cylinder (101) is provided with a central tube (102) positioned along the length of the cylinder (101). According to an exemplary embodiment, the tube (102) is positioned in coaxial arrangement with the cylinder (101). The tube has a first vapor inlet end (107a) and a second vapor inlet end (107b). The generator (100) further comprises at least two mutually opposed free pistons (103a, 103b) mounted on the tube (102) between the first inlet end (107a) and the second vapor inlet end (107b) of the tube (102). The tube (102) transfers vapor from the inlets (107a, 107b) to the pressurized side of the pistons (103a, 103b). According to another embodiment of the present invention, the tube (102) also contains an interior concentric tube (not shown) which is equipped with vapor ports fitted with vapor inlet valves (108a, 108b, 108c) to provide appropriate valve action by partial rotation of the interior tube in order to align the ports in both the interior and external tube to introduce vapor to actuate pistons (103a, 103b) to slidingly move the pistons in opposite directions simultaneously along the length of the tube (102) between two peripheral vapor inlet valves (108a, 108c), wherein a central vapor inlet valve (108b) separates the pistons (103a, 103b) inside the closed cylinder (101). As the vapor is introduced on the pressure side of the pistons (103a, 103b), exhaust valves (109a, 109b, 109c) are simultaneously opened on the opposite end of the piston stroke allowing the expanded vapor to flow to a condensing system (not shown).

According to another exemplary embodiment, the pistons (103a, 103b) move along the longitudinal axis of the cylinder (101) in opposite directions simultaneously along the length of the central tube (102) as a result of the introduction of pressurized vapor or injection of a liquid in a thermodynamic state to become vapor at the terminus of each stroke of the pistons (103a, 103b). The pistons (103a, 103b) are slidingly sealed to the longitudinal tube (102) located on the central axis of the cylinder (101).

According to another exemplary embodiment as shown in FIG. 1, the central tube (102) serves to maintain alignment of the pistons (103a, 103b) as they move through the cylinder (101). Further, the central tube (102) acts as a conduit for vapor to travel from the vapor inlets (107a-b) to the rotary vapor inlet valves (108a-c), wherein the rotary valves (108a-c) are configured to be located proximate to the terminus of the reciprocating motion of each of the pistons (103a, 103b).

According to another exemplary embodiment as shown in FIG. 1, one or more 'L-shaped' piston magnets (104a, 104b) are attached to upper peripheral circumference of the pistons (103a, 103b), further one or more 'L-shaped' piston magnets (104a', 104b') are attached to lower peripheral circumference of the pistons (103a, 103b).

The shape and positioning of the piston magnets (104a, 104a', 104b, 104b') create a moving magnetic field possessing similar polarity with respect to electrically conductive materials (106a, 106b), wherein the electrically conductive materials (106a, 106b) are incorporated as a field coil winding to the wall of the cylinder (101) at a position adjacent to the end points of the strokes of the pistons along the length of the wall of the cylinder (101). The movement of the magnetic field through coils of conductive material produces electricity in the conductor coil (106 a, 106b).

According to another exemplary embodiment of the present invention, the arrangement of polarity of the magnets (104a, 104b, 105a, 105b) and the magnets (104a', 104b', 105a', 105b') can be interchanged without departing from the scope and spirit of the present invention.

According to another exemplary embodiment of the present invention, the repulsion magnets (105a, 105b, 105a', 105b') are located at a distance from the cylinder wall such as to minimize magnetic interference. As the pistons near the terminus of their respective travel limits/strokes, the magnetic poles enter magnetic fields of similar polarity magnets (104a, 104b, 105a, 105b) repulse each other and the other set of magnets (104a', 104b', 105a', 105b') with similar polarity repulse each other to provide cushioned rebound effect as a result of the kinetic energy/momentum of the moving pistons (103a, 103b) being converted to potential energy stored in and released by the opposing magnetic fields while conserving momentum.

According to another exemplary embodiment of the present invention, the vapor inlet valves (108a, 108b, 108c) which are located in the central tube (102) are of a rotary port-alignment design and are individually activated by an electronic-controller controlled solenoid. According to another embodiment, when the generator (100) is powered by a high enthalpy fluid in a thermodynamic state to become vapor, solenoid activated injections are utilized in place of the rotary valves. Control of piston speed to normalize/moderate electric current generation will be accomplished using the control system known in the art.

According to another exemplary embodiment of the present invention, two or more exhaust valves (109a, 109b, 109c) are fitted to the outer circumference of the cylinder (101) proximate to the terminus of travel of each of the pistons (103a, 103b), wherein the exhaust valves (109a, 109b, 109c) comprises of rings with controller-controlled solenoid activated rotary port-alignment design. The exhaust valves (109a, 109b, 109c) are opened at the initiation of the power stroke caused by the introduction of vapor or a high enthalpy liquid in a thermal condition to vaporize, to the side of the piston (103a, 103b) opposite the corresponding exhaust port. The exhaust vapor is ducted via the manifold to a rapid condensing system.

According to another exemplary embodiment of the present invention, the generator (100) further comprises lubrication and cylinder cooling means, wherein the cooling means provide cooling fluid to piston ring lands (110 a, b) via telescoping tubes (111a, 111b) attached at both ends (101a, 101b) of the cylinder (101). Lubricating and/or cooling fluid flow is provided and controlled by an external metered pump.

According to another exemplary embodiment of the present invention, plurality of seals (112) is provided on the circumferential ends of the pistons (103a, 103b) to provide air-tight reciprocating motion of the pistons (103a, 103b) inside the cylinder (101).

According to another exemplary embodiment of the present invention, plurality of seals (112) is provided at the ends (101a, 101b) of the cylinder (101) to provide air-tight seal to the cylinder (101).

According to another exemplary embodiment of the present invention, structural cylinder wall insulation layer (113) is provided around the external surface of the cylinder (101), so as to provide insulation between the cylinder (101) and the conducting coil windings (111a, 111b).

According to another exemplary embodiment of the present invention as shown in FIG. 2, in contrast to FIG. 1, instead of two piston magnets attached to each piston one at lower end of the piston and the other at upper end of the piston, a one-piece L-shaped piston magnet (104) is configured to each of the pistons (103a, 103b) on their entire peripheral circumference. Further, instead two of repulsion magnets attached to either end of the circumference of the cylinder (101) one at lower end of the circumference of the cylinder (101) and the other at upper end of the circumference of the cylinder (101), a one-piece L-shaped repulsion magnet (105) is configured to mount on the entire inner circumference of the cylinder (101) on both ends of the cylinder (101), wherein the repulsion magnet (105) and the corresponding piston magnets (104) are configured to face each other with similar polarity to generate repulsive force when they approach each other to provide cushioned rebound effect to movement of the pistons (103a, 103b) while conserving momentum.

Because many modifications, variations, and changes in detail can be made to the described preferred embodiments of the invention, it is intended that all matters in the foregoing description and shown in the accompanying drawings be interpreted as illustrative and not in a limiting sense.

Thus, the scope of the invention should be determined by the appended claims and their legal equivalence.

What is claimed is:

1. A vapor powered electro-mechanical generator (100), wherein the generator comprises:
   a cylinder (101) which is sealed at both ends, wherein the cylinder (101) is provided with two peripheral vapor inlet valves (108a, 108c) and a central vapor inlet valve (108b);
   two pistons (103a, 103b) configured to slide simultaneously along the longitudinal axis of the cylinder (101) in opposite directions with the introduction of pressurized vapor from the vapor inlet valves (108a, 108b, 108c);
   one or more piston magnets (104a, 104b) are attached to upper peripheral circumference of the pistons (103a, 103b), and one or more piston magnets (104a', 104b') are attached to lower peripheral circumference of the pistons (103a, 103b);
   one or more repulsion magnets (105a, 105b) are attached to upper peripheral circumference of the cylinder (101) and one or more repulsion magnets (105a', 105b') are attached to lower peripheral circumference of the cylinder (101), wherein the repulsion magnets and the corresponding adjacent piston magnets are configured to have similar polarity, thereby repulse each other to provide cushioned rebound effect to movement of the pistons (103a, 103b) while conserving momentum;
   three exhaust valves (109a, 109b, 109c) are configured to be opened by the introduction of vapor; and
   one or more field coil windings (106a, 106b) attached to the wall of the cylinder (101), wherein movement of the piston magnets (104a, 104a', 104b, 104b') through the coil windings (106a, 106b) to produce electricity; wherein the pistons (103a, 103b) are provided with a cylinder cooling/lubricating system that is configured to provide cooling/lubricating fluid to piston cooling ducts (110a, 110b) via telescoping tubes (111a, 111b).

2. The generator of claim 1, wherein the pistons (103a, 103b) are slidingly sealed to a longitudinal tube (102) that is coaxially positioned along the length of the cylinder (101).

3. The generator of claim 1, wherein the pistons (103a, 103b) configured to be positioned between the two peripheral vapor inlet valves (108a, 108c) with the central vapor inlet valve (108b) positioned between the pistons (103a, 103b).

4. The generator of claim 1, wherein the piston magnets (104a, 104a', 104b, 104b') are 'L-shaped' magnets.

5. The generator of claim 1, wherein the repulsion magnets (105a, 105a', 105b, 105b') are 'L-shaped' magnets.

6. The generator of claim 1, wherein the sealed ends (101a, 101b) of the cylinder (101) are provided with plurality of air-tight seals (112).

7. The generator of claim 1, wherein the circumferential ends of the pistons (103a, 103b) are provided with plurality of seals (112) to provide air-tight reciprocating motion of the pistons (103a, 103b) inside the cylinder (101).

8. The generator of claim 1, wherein the generator is a portable generator.

9. The generator of claim 1, wherein the external surface of the cylinder (101) is provided with at least one insulation layer (113) so as to provide insulation between the cylinder (101) and the conducting coil windings (111a, 111b).

10. A portable vapor powered electro-mechanical generator (100), wherein the generator comprises:
    a cylinder (101) which is sealed at both ends, wherein the cylinder (101) is provided with a central tube (102) coaxially positioned along the length of the cylinder (101), the tube is provided with two peripheral vapor inlet valves (108a, 108c) and a central vapor inlet valve (108b);
    at least two mutually opposed pistons (103a, 103b) are slidingly sealed to the central tube (102) longitudinally between the two peripheral vapor inlet valves (108a, 108c) with the central vapor inlet valve (108b) positioned between the pistons (103a, 103b), thereby with the introduction of pressurized vapor from the inlet valves (108a, 108b, 108c), the pistons (103a, 103b) slide along the longitudinal axis of the cylinder (101) in opposite directions simultaneously along the length of the central tube (102);
    one or more 'L-shaped' piston magnets (104a, 104b) are attached to upper peripheral circumference of the pistons (103a, 103b), and one or more 'L-shaped' magnets (104a', 104b') are attached to lower peripheral circumference of the pistons (103a, 103b);
    one or more 'L-shaped' repulsion magnets (105a, 105b) are attached to upper peripheral circumference of the cylinder (101) and one or more 'L-shaped' repulsion magnets (105a', 105b') are attached to lower peripheral circumference of the cylinder (101), wherein the repulsion magnets and corresponding adjacent piston magnets are arranged to have similar polarity to repulse each other so as to provide cushioned rebound effect to movement of the pistons (103a, 103b) while conserving momentum;
    at least three exhaust valves (109a, 109b, 109c) fitted to the outer circumference of the cylinder (101) proximate to the terminus of travel of each of the pistons (103a, 103b), wherein the exhaust valves (109a, 109b, 109c) are opened at the initiation of the power stroke caused by the introduction of vapor through the inlet valves (108a, 108b, 108c), thereafter the exhaust vapor is ducted to a condensing system;
    a cylinder cooling system configured to cool the pistons (103a, 103b), wherein the cooling system provides cooling fluid to piston ring lands (110 a, b) via telescoping tubes (111a, 111b) attached at both ends of the cylinder; and
    one or more field coil windings (106a, 106b) attached to the external wall of the cylinder (101) at a position adjacent to the end points of the strokes of the pistons along the length of the wall of the cylinder (101), wherein movement of the piston magnets (104a, 104a', 104b, 104b') through the coil windings (106a, 106b) to produce electricity.

11. The portable generator of claim 10, wherein the tube (102) comprises an interior concentric tube that is equipped with vapor ports to provide appropriate valve action by partial rotation of the interior tube in order to align ports in both the interior and external tube to introduce vapor to actuate pistons (103a, 103b).

12. The portable generator of claim 10, wherein the repulsion magnets (105a, 105b, 105a', 105b') are located at a predetermined distance from the cylinder wall so as to minimize magnetic interference.

13. The portable generator of claim 10, wherein the exhaust valves (109a, 109b, 109c) and the vapor inlet valves (108a, 108b, 108c) are configured to be individually activated by an electronic controller-controlled solenoid.

14. The portable generator of claim 10, wherein the generator is configured with solenoid activated injections to provide a high enthalpy fluid in a thermodynamic state to become vapor, so as to power the generator.

15. The portable generator of claim 10, wherein speed of sliding movement of the pistons (103a, 103b) is controlled using a control system.

16. The portable generator of claim 10, wherein the cooling/lubricating system uses cooling/lubricating fluid, whereby the flow rate of the fluid is controlled by an external metered pump.

17. The portable generator of claim 10, wherein the circumferential ends of the pistons (103a, 103b) and the sealed ends (101a, 101b) of the cylinder (101) are provided with plurality of air-tight seals (112).

18. The portable generator of claim 10, wherein the external surface of the cylinder (101) is provided with at least one insulation layer (113) so as to provide insulation between the cylinder (101) and the conducting coil windings (111a, 111b).

19. A portable vapor powered electro-mechanical generator (100), wherein the generator comprises:
- a cylinder (101) which is sealed at both ends, wherein the cylinder (101) is provided with a central tube (102) coaxially positioned along the length of the cylinder (101), the tube is provided with two peripheral vapor inlet valves (108a, 108c) and a central vapor inlet valve (108b);
- at least two mutually opposed pistons (103a, 103b) are slidingly sealed to the central tube (102) longitudinally between the two peripheral vapor inlet valves (108a, 108c) with the central vapor inlet valve (108b) positioned between the pistons (103a, 103b), thereby with the introduction of pressurized vapor from the inlet valves (108a, 108b, 108c), the pistons (103a, 103b) slide along the longitudinal axis of the cylinder (101) in opposite directions simultaneously along the length of the central tube (102), wherein speed of sliding movement of the pistons (103a, 103b) is regulated using a control system;
- one 'L-shaped' piston magnet (104) is attached circumference of each of the pistons (103a, 103b);
- one 'L-shaped' repulsion magnets (105) is configured to mount on the entire inner circumference of the cylinder (101) on both ends of the cylinder (101), wherein the repulsion magnet and corresponding adjacent piston magnet have similar polarity to repulse each other so as to provide cushioned rebound effect to movement of the pistons (103a, 103b) while conserving momentum;
- at least three exhaust valves (109a, 109b, 109c) fitted to the outer circumference of the cylinder (101) proximate to the terminus of travel of each of the pistons (103a, 103b), wherein the exhaust valves (109a, 109b, 109c) are opened at the initiation of the power stroke caused by the introduction of vapor through the inlet valves (108a, 108b, 108c), thereafter the exhaust vapor is ducted to a condensing system;
- a cylinder cooling system configured to cool the pistons (103a, 103b), wherein the cooling system is controlled by an external metered pump to provide cooling/lubricating fluid to piston ring lands (110 a, 110b) via telescoping tubes (111a, 111b) attached at both ends of the cylinder; and
- one or more field coil windings (106a, 106b) attached with at least one insulation layer (113) to the external wall of the cylinder (101) at a position adjacent to the end points of the strokes of the pistons along the length of the wall of the cylinder (101), wherein movement of the piston magnets (104) through the coil windings (106a, 106b) produces electricity.

* * * * *